Oct. 18, 1966 G. EVERETT 3,278,985

MOLDING DEVICES

Filed June 25, 1965 2 Sheets-Sheet 1

INVENTOR.
GEORGE EVERETT
BY
Harry S. Shapiro
ATTORNEY

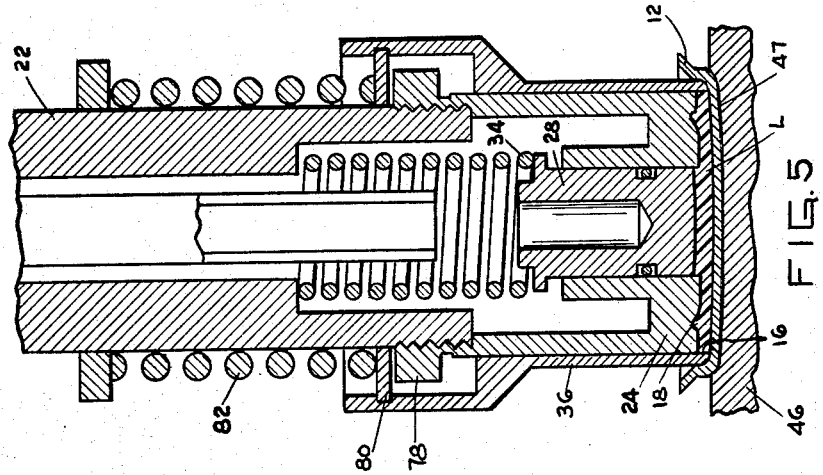
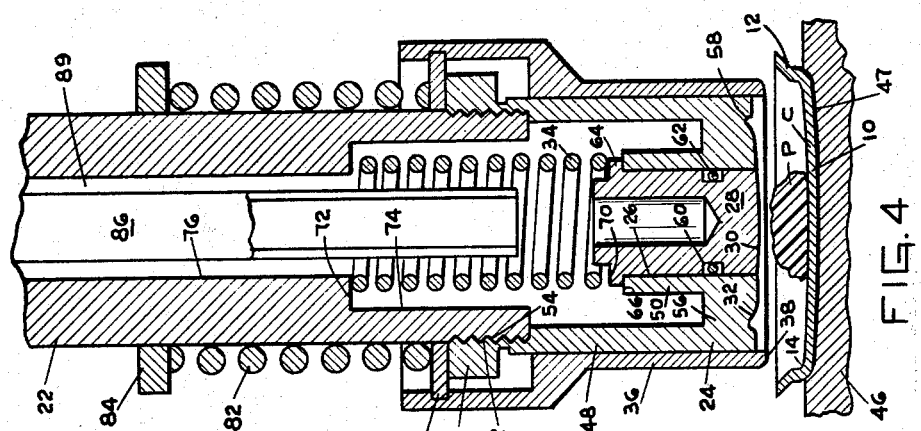
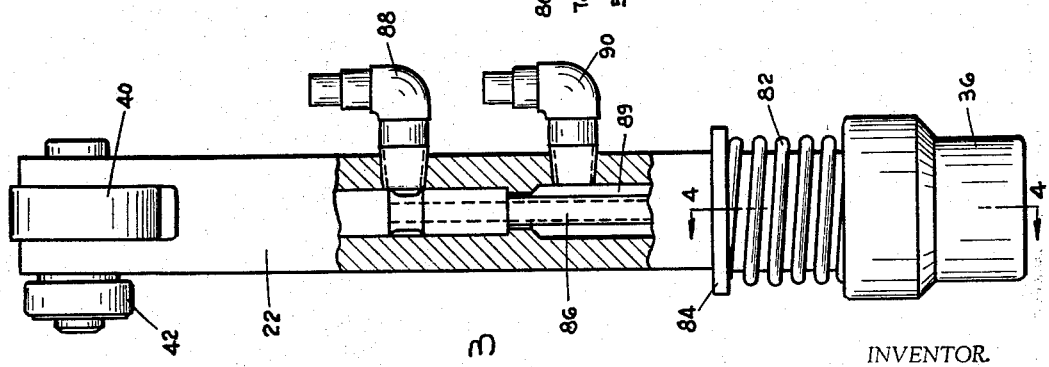

United States Patent Office 3,278,985
Patented Oct. 18, 1966

3,278,985
MOLDING DEVICES
George Everett, Burlington, Unionville, Conn., assignor to Gros-Ite Industries, Inc., Farmington, Conn., a corporation of Connecticut
Filed June 25, 1965, Ser. No. 466,924
6 Claims. (Cl. 18—5)

The invention relates to improvements in molding devices for molding charges of plastic material to provide seal liners in bottle caps or like closures.

The individual charges of plastic material which are placed in bottle caps and molded therein are necessarily small in amount, on the order of approximately 200 milligrams (mg.). Where the amount of plastic material to furnish a seal liner for a cap is less than the amount necessary to adequately fill out the base of a cap, including a sealing bead or ring at the cap's sealing area, the lined cap is defective and constitutes a reject unsuitable for use in capping a bottle. When working with quantities as small as the aforementioned fraction of a gram for the individual charges of plastic material, the variables caused by the variations in temperature of the heated plastic material, variations caused by the measuring means, etc., make it impossible to place the same exact, adequate minimum quantity in each of the caps which, on production equipment, are being processed at a rate of as high as 1200 units or more a minute. To assure adequate fill-out of the molded material, it is essential therefore to operate with a tolerance above the minimum quantity required. The heated plastic charges may run as much as 50 mg. above an adequate minimum requirement of 170 mg. for polyethylene, and still be within the tolerance imposed by the aforementioned variables. Overages of similar magnitude are encountered where the plastic material is a vinyl resin composition or other thermoplastic or elastomer composition.

With the prior art devices of which I am aware, unless the plastic material is permitted to flow out onto the cap's skirt and form flash in such area, the critical dimensions required at the sealing area cannot be uniformly obtained where the quantity of the plastic charge is on the high side of the tolerance. It has been established that flash on the skirt portion of a cap is undesirable because of its interference with the proper attachment of a cap so lined with the lip of a bottle. Thus, where the seal liner is molded by a device constructed to prevent flash and the plastic charge is of an amount on the high side of tolerance, the cavity provided between the cap and the face of the molding device is too small for the amount of material being molded, and the molding device cannot reach the bottom of its stroke. Under these circumstances, the critical annular sealing area (the area adjacent and inward of the cap's skirt) is unduly thick or high. When a cap so lined is placed on the lip of a bottle, it will not be centered, and upon crimping the skirt of the cap, the cap will not properly grip the bottle.

The metal cap is somewhat domed and has a certain measure of resilience. However, one cannot rely upon such resilience to take up any excess material which is confined between the cap and the molding device during molding. Distorting the dimensions of the cap serves to introduce a further variable at the critical, annular, sealing area. The resilient base of the cap does not react uniformly throughout the area upon which the pressure is being imposed, and as a result, variation in thickness would be obtained at the sealing area. Moreover, caps vary in thickness. When the sealing area of a lined cap is non-uniform in height, that is, when the thickness in one segment of the annular sealing area is different than the thickness at another segment of the sealing area, such lined cap when positioned on the lip of a bottle, will be tilted, and will prevent proper gripping upon crimping. The result is an improper and defectively capped bottle.

It will be apparent that there is a definite need for a device to furnish caps with molded seal liners which eliminates variations in dimensions at the critical sealing area. The molding devices of which I am aware, and which are constructed to prevent the formation of undesirable flash on the skirts of the caps, do not make any suitable provision for the unavoidable excess in the charges of plastic material subjected to molding. Also, prior art devices do not provide means for compensating for the variations in thickness of the caps to be lined.

The primary object of the invention is to provide a device for molding charges of plastic material in bottle caps or like closures to form seal liners, wherein the molding device is constructed to eliminate variations in dimensions at the critical sealing area of the seal liners produced by the device.

This main object, and other objects and advantages of the invention, will be apparent from the following detailed description, taken in conjunction with the drawings which illustrate a preferred embodiment of the invention, in which:

FIG. 3 is a side elevational view, partly broken away and in section, showing a plunger provided with a device for molding a seal liner in a cap as shown in FIGS. 1 and 2;

FIG. 4 is an enlarged vertical, cross-sectional view taken approximately in the plane of 4—4 of FIG. 3, this view including a partial showing of a platen for supporting a cap having a charge of plastic material positioned therein in readiness for molding of the seal liner, also a partial showing of means for positioning the cap beneath the molding device; and FIG. 5 is a view similar to FIG. 4, except that the molding device is shown in molding position.

While the invention will be specifically described with relation to the lining of bottle caps, it will be understood that the invention also is applicable for other types of closures provided with seal liners.

Figure 1:
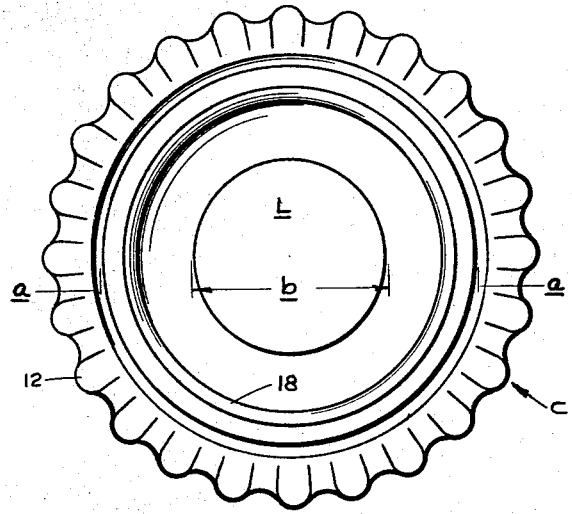
FIG. 1 is an inside plan view, on an enlarged scale, of a seal lined cap produced by the molding device of the invention.
Figure 2:
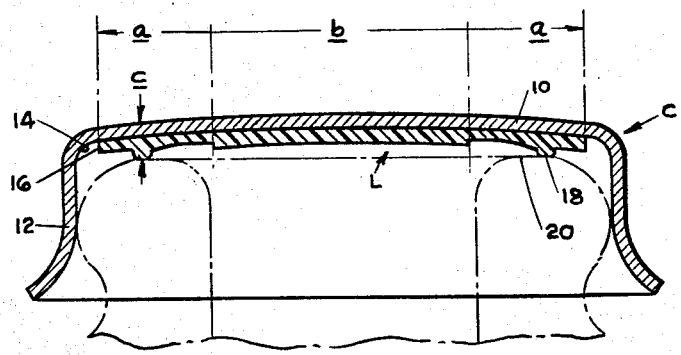
FIG. 2 is a cross-sectional view, also on an enlarged scale, showing a seal lined cap made by the molding device of the invention as related to the lip of a bottle before the lined cap is crimped to the bottle.

As shown in FIGS. 1 and 2, a standard bottle cap C comprises a circular base portion 10 and a corrugated skirt portion 12 integrally joined to the base portion by a corner radius 14. A seal liner L of thermoplastic or elastomer material is molded to cover the interior of the circular base 10 with the outer periphery 16 of the liner terminating immediately adjacent and inward of the corner radius 14. The seal liner has a sealing area, designated $a$, which preferably includes a projecting, annular sealing bead 18 which is, in effect, an O-ring. The sealing bead is adapted for compressive engagement with the lip 20 of a bottle or like container. Functionally, the area $b$ within the annular sealing area $a$ serves merely to cover the metal of the adjacent, underlying portion of the cap's base portion 10. Within the area $b$, the thickness of the seal liner is not critical for the proper functioning of the seal liner in its relationship to the metal cap and for the function of the lined cap with respect to the lip of a bottle to which the lined cap is secured.

The molding device of the invention takes advantage of the absence of the criticality of dimensions in the area $b$. This is accomplished by providing a molding device provided with coacting means of a different character for molding the sealing area *a* and for molding the area *b*. The means for molding the sealing area *a* is solid or fixed in its relationship to the plastic charge being molded to eliminate variations in the dimensions of the seal liner at such area. The means for molding the area *b* is resiliently and movably related with respect to the means for molding the area *a* to permit the absorption or take-up of any excess of the plastic charge in the area where dimensional variations are functionally immaterial.

As shown in FIGS. 3–5, a device made in accordance with the invention generally comprises a plunger 22 having at the lower end thereof a molding head. The molding head includes a die 24 for molding the sealing area *a* of a liner L, this die being fixedly connected to the plunger 22. The die 24 which preferably is formed to provide a sealing bead, has a central opening 26 within which is positioned an inner die 28 in close sliding fit relationship with the die 24. Stop means is provided for locating the molding face 30 of the inner die in the desired relationship with respect to the molding face 32 of the bead forming die 24. Resilient means 34, preferably in the form of a helically coiled compression spring, is provided for engagement with the inner die 28 whereby the inner die may be retracted with respect to the bead forming die 24. A resiliently mounted fender sleeve 36 surrounds the bead forming die 24. The fender sleeve has a forward edge 38 engageable with a bottle cap C at the cap's corner radius 14 to limit lateral flow of a heated charge of plastic material P molded by the bead forming and inner dies 24 and 28.

The plunger 22 which carries the compound molding die comprising the bead forming die 24 and the inner die 28, together with the fender sleeve 36, may be constructed for incorporation in any suitable machine for making lined bottle caps. In the embodiment illustrated, the plunger is made for use in a machine as disclosed in Aichele Patent No. 3,135,019, granted June 2, 1964. When used in such a machine, the plunger is provided at its upper end with a roller 40 and an offset roller 42 for cooperative relationship with means for reciprocating the plunger so that the molding head thereof will move in timed relationship into and out of caps C, each having a molding charge P positioned therein as disclosed in said Aichele patent. The charged caps are presented to a plurality of plungers each provided with the molding head of the invention. In molding, the charged caps are supported upon an anvil 46 having depressions 47 for nesting the caps. The means for presenting the charged caps to the molding head at the lower end of each plunger does not form any part of the present invention, nor does the means for reciprocating the plunger. It will be understood that the molding means of the invention may be associated with any suitable means for carrying the compound molding die of the invention.

The plastic material of the charges P is in heated condition when positioned in the caps C for molding. The plastic material may be of any desired composition such as polyethylene, a vinyl resin compound such as a copolymer of vinyl acetate and vinyl chloride, or any other suitable thermoplastic composition or elastomer composition.

In greater detail, and as illustrated, the bead forming die 24 is made as a separate member and immovably connected to the plunger for movement therewith in a fixed relationship. While the bead forming die may be made as an integral part of the plunger, for manufacturing convenience, it is preferred that the bead forming die be made as a separate piece and connected to the plunger. As illustrated, the bead forming die comprises a pair of parallel, laterally spaced, cylindrical sleeves 48 and 50. The outer sleeve 48 is longer than the inner sleeve and is provided at its upper end with an internally threaded portion 52 to enable the die to be threaded onto the portion 54 of the plunger for the secure connection of the parts. The lower ends of the sleeves 48 and 50 are bridge or connected by a base portion 56, the outer face of which has formed therein an annular recess 58 to furnish the bead 18 when a charge P is molded in a cap.

The inner die 28 is cylindrical and is positioned within the opening 26 of the die 24 with a close sliding fit. The inner die may be provided with an annular groove 60 within which is positioned an O-ring 62 to assure a suitable seal between the vertically slidable inner die and the guide provided by the inner sleeve 50 of the bead forming die 24. The inner die is provided near the top thereof with an external annular flange 64 which cooperates with the top edge 66 of the inner sleeve 50 to provide a stop limiting the downward movement of the inner die with respect to the surrounding bead forming die. The molding face 30 of the inner die is thereby located in the desired position with relation to the molding face 32 of the bead forming die. In the up position of the plunger and its molding head as shown in FIG. 4, the molding face of the inner die at the outer periphery thereof is substantially aligned with the inner peripheral edge of the bead forming die. Preferably, the molding face 30 of the inner die is provided with a radius or is convexly shaped. Also, the inner die is made hollow for a portion of its length in the area rearward of the molding face for a purpose to be subsequently described.

Whereas, the bead forming die 24 is in fixed relation to the plunger 22, the inner die 28 is resiliently mounted so that its molding face is retractable with respect to the molding face of the bead forming die. For this purpose, one end of the aforementioned helically coiled compression spring 34 is seated against the upper end of the inner die where a shoulder 70 is provided. The opposite end of the compression spring bears against a shoulder 72 which is the base of a counterbore 74 formed on a diameter sufficient to allow the spring to extend into the plunger. The plunger is also provided with a central bore 76 of a smaller diameter than the counterbore 74 for a purpose to be subsequently described.

In order to prevent flash on the skirts of the caps upon molding of the plastic charges in the caps, the resiliently mounted fender sleeve 36 closely surrounds the outer sleeve 48 of the bead forming die 24. The fender sleeve is limited in its downward movement by stop means preferably provided by an annular flange 78 at the upper end of the bead forming die, or its outer sleeve 24. The fender sleeve is provided with an internal ring 80 fixed to the sleeve cooperable with the stop flange 78. The ring 80 also serves as a seat for the lower end of a helically coiled compression spring 82 which surrounds the plunger 22 and has its upper end bearing against a washer 84 fixed to the plunger. The plunger may be made of square stock for the upper portion of its length to the point where the washer 84 is located. At this point and below, the plunger may be machined to provide a cylindrical shape, whereby the juncture of the square cross-section with the round cross-section provides a shoulder for the seating of the washer 84. As shown in FIG. 4, and in the inoperative position, the fender sleeve is resiliently urged to its most downward position where its forward edge 38 projects beyond the molding face of the adjoining bead forming die, also beyond the molding face of the inner die 28.

Since the charges of plastic material are in heated condition when placed in the caps, and to prevent sticking of the molding device to the seal liner which it forms, the molding device is provided with means for circulating a coolant to the areas affected by the heated charges. For this purpose, the plunger 22 is provided with the aforementioned central bore 76, also the counterbore 74. The bore 76 has positioned therein a tube 86, the upper end of which is in communication with an inlet fitting 88 (FIG. 3) threaded into the wall of the plunger. The tube 86 has an external diameter less than the diameter of the bore 76 to thereby provide a return passage 89 to an outlet fitting 90. Thus, a coolant entering the inlet fitting 88 passes down the tube 86, circulates between the outer and inner sleeves 48 and 50 of the bead forming die 24 and into the bore provided behind the wall providing the molding face 30 of the inner die, and then the coolant is circulated back through the passage 89 and out of the fitting 90. Any suitable coolant may be used such as water at room or lower temperatures.

The operation of the molding device of the invention will be apparent from FIG. 5. When the plunger is moved down to molding position, or from the position of FIG. 4 to the position of FIG. 5, the forward edge 38 of the resiliently mounted fender sleeve 36 engages the cap at the corner radius 14 to restrict lateral flow of the plastic charge, and to prevent flash being formed on the skirt 12 of the cap. With the cap acting as a female die, and with the cavity formed between the cap and the incoming dies 24 and 28, the plastic material flows laterally to fill out the cavity. The convexity of the face 30 on the inner die assists in the desired lateral flow. In the final molding position as shown in FIG. 5, the molding face 32 of the sealing area die 24 is brought to a fixed position with relation to the surface of the anvil 46 upon which the caps C are supported. As a result, the combined thickness of the cap and the molded liner at the sealing area, designated c, is alway maintained constant and identical from unit to unit, though there may be variations in the thickness of the caps being processed and variations in the quantities of the plastic charges. Such result obtains because excess plastic material may flow to the central area where the inner die is located. If, for example, a molding pressure of 250 lbs. is necessary to fill out the cavity between the base 10 of the cap and the molding faces of the bead forming and inner dies, a spring strength for the spring 34 is selected to exceed by a small amount the molding pressure of 250 lbs. Thus, the excess plastic material of a charge is taken up or absorbed by the resiliently mounted inner die 28, which is caused to be retracted by the back pressure exerted thereon due to the excess material in the cavity. In this way, the exact dimensions desired in the sealing area $a$, or in the area defined by the molding face of the die 24, is assured. The combined thickness $c$ of the cap and liner at the sealing area $a$ is maintained uniform and constant at all times. Though the excess of plastic material results in a slightly raised area in the central portion $b$ of the liner, as shown in exaggerated form in FIG. 2, such increase in dimension of the liner is immaterial in this non-critical area.

It will be apparent that various changes and modifications may be made with regard to the preferred form of the invention as illustrated and specifically described. If desired, the central opening in the die for forming the sealing area may be made larger by making such die of a single sleeve rather than a pair of laterally spaced sleeves as illustrated. The single sleeve would have the same outer diameter as the outer sleeve 48. Increasing the central opening of the bead forming die sleeve would, of course, include increasing the diameter of the inner die. As a result, any excess of plastic material would be taken up in a larger area centrally or inward of the critical sealing area. These, and other changes and modifications may be made without departing from the spirit and scope of the invention as sought to be defined in the following claims.

I claim:
1. A device for molding charges of plastic material in bottle caps or the like to form seal liners including a sealing area for compressive engagement with the lip of a bottle or the like, said device comprising a plunger having at the lower end thereof and fixedly related thereto a sealing area forming die having a central opening, an inner die positioned within said opening in close sliding fit relationship with the sealing area forming die, stop means for locating the molding face of the inner die with respect to the molding face of the sealing area forming die, resilient means in engagement with the inner die whereby the inner die may be retracted with respect to the sealing area forming die upon molding a plastic charge in a bottle cap or the like supported upon an anvil, and a resiliently mounted fender sleeve constructed and arranged to provide a continuous, unbroken forward edge engageable with a bottle cap or the like at the intersection of the skirt and base portions thereof, said fender sleeve surrounding said sealing area forming die to prevent lateral flow onto a skirt portion of plastic material molded in a bottle cap or the like by said sealing area forming and inner dies.

2. A device as set forth in claim 1, wherein the sealing area forming die is a separate member connected to the plunger.

3. A device as set forth in claim 1, wherein the molding face of the sealing area forming die has a recess to provide a sealing bead.

4. A device for molding charges of plastic material in bottle caps or the like to form seal liners including a sealing area for compressive engagement with the lip of a bottle or the like, said device comprising a plunger, a sealing area forming die having laterally spaced inner and outer cylindrical sleeves connected at their lower ends by a base portion the outer face of which has an annular recess to form a sealing bead, said outer sleeve being fixedly secured to the lower end of the plunger, an inner die positioned within the opening provided by said inner sleeve in close sliding fit relationship and guided thereby, stop means for locating the molding face of the inner die with respect to the molding face of the sealing area forming die, resilient means in engagement with the inner die whereby the inner die may be retracted with respect to the sealing area forming die, and a resiliently mounted fender sleeve having the forward edge thereof engageable with a bottle cap or the like, said fender sleeve surrounding said sealing area forming die to limit lateral flow of plastic material molded by said sealing area forming and inner dies.

5. A device as set forth in claim 4, wherein the inner die comprises a hollow cylindrical sleeve closed at its lower end to provide the molding face of the inner die, said molding face being convexly shaped.

6. A device as set forth in claim 4, wherein the inner die comprises a hollow cylindrical sleeve closed at its lower end to provide the molding face of the inner die, said molding face being convexly shaped; wherein the plunger is provided with a bore and a counterbore, a tube being positioned within the plunger to provide a second passage between the tube and the plunger, whereby a coolant may be circulated to the rear side of said base portion and to the rear side of said lower end of the inner die sleeve; wherein the resilient means in engagement with the inner die comprises a helically coiled compression spring positioned in said counterbore in engagement with a shoulder provided by the plunger; and wherein the stop means comprises cooperating means provided by said inner sleeve of the sealing area forming die and the inner die cylindrical sleeve.

References Cited by the Examiner

UNITED STATES PATENTS

| 1,253,316 | 1/1918 | Weiland | 18—19 |
| 1,482,732 | 2/1924 | Calleson. | |
| 1,793,089 | 2/1931 | Heyes | 18—19 |
| 1,806,739 | 5/1931 | Busch. | |
| 1,904,920 | 4/1933 | Hothersall. | |
| 1,972,789 | 4/1934 | Newkerk | 18—19 X |
| 2,484,656 | 10/1949 | Silska et al. | 18—19 X |
| 2,963,738 | 12/1960 | Brandes et al. | 25—102 X |
| 3,015,843 | 1/1962 | Gora. | |

WILLIAM J. STEPHENSON, *Primary Examiner.*